(12) United States Patent
Martini

(10) Patent No.: US 11,124,006 B2
(45) Date of Patent: Sep. 21, 2021

(54) PRINTING OF SECURITY FEATURES

(71) Applicant: SICPA HOLDING SA, Prilly (CH)

(72) Inventor: Thibaut Martini, Renens (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 16/621,151

(22) PCT Filed: Jun. 20, 2018

(86) PCT No.: PCT/EP2018/066416
§ 371 (c)(1),
(2) Date: Dec. 10, 2019

(87) PCT Pub. No.: WO2019/002046
PCT Pub. Date: Jan. 3, 2019

(65) Prior Publication Data
US 2020/0189303 A1 Jun. 18, 2020

(30) Foreign Application Priority Data
Jun. 26, 2017 (EP) .................................... 17177904

(51) Int. Cl.
*B41M 3/14* (2006.01)
*B41M 5/00* (2006.01)
*C09D 11/322* (2014.01)
*C09D 11/50* (2014.01)
*C09D 11/52* (2014.01)

(52) U.S. Cl.
CPC .......... *B41M 3/144* (2013.01); *B41M 5/0023* (2013.01); *B41M 5/0047* (2013.01); *C09D 11/322* (2013.01); *C09D 11/50* (2013.01); *C09D 11/52* (2013.01)

(58) Field of Classification Search
CPC .. B41M 3/144; B41M 5/0023; B41M 5/0047; C09D 11/322; C09D 11/50; C09D 11/52
See application file for complete search history.

(56) References Cited

U.S. PATENT DOCUMENTS

| | | | |
|---|---|---|---|
| 4,705,300 A | 11/1987 | Berning et al. | |
| 4,705,356 A | 11/1987 | Berning et al. | |
| 4,721,271 A | 1/1988 | Goldstein et al. | |
| 4,838,648 A | 6/1989 | Phillips et al. | |
| 5,084,351 A | 1/1992 | Phillips et al. | |
| 5,211,877 A | 5/1993 | Andrejewski et al. | |
| 5,214,530 A | 5/1993 | Coombs et al. | |
| 5,281,480 A | 1/1994 | Phillips et al. | |
| 5,362,315 A | 11/1994 | Müller-Rees et al. | |
| 5,383,995 A | 1/1995 | Phillips et al. | |
| 5,569,535 A | 10/1996 | Phillips et al. | |
| 5,571,624 A | 11/1996 | Phillips et al. | |
| 5,828,394 A | 10/1998 | Khuri-Yakub et al. | |
| 6,180,029 B1 | 1/2001 | Hampden-Smith et al. | |
| 6,394,363 B1 | 5/2002 | Arnott et al. | |
| 6,410,130 B1 | 6/2002 | Schuhmacher et al. | |
| 6,423,246 B1 | 7/2002 | Kasch et al. | |
| 6,531,221 B1 | 3/2003 | Schuhmacher et al. | |
| 6,565,770 B1 | 5/2003 | Mayer et al. | |
| 6,582,781 B1 | 6/2003 | Schuhmacher et al. | |
| 6,838,166 B2 | 1/2005 | Phillips et al. | |
| 7,108,742 B2 | 9/2006 | Hall-Goulle et al. | |
| 7,241,489 B2 | 7/2007 | Argoitia et al. | |
| 7,416,688 B2 | 8/2008 | Pfaff et al. | |
| 7,476,411 B1 | 1/2009 | Hampden-Smith et al. | |
| 7,922,936 B2 | 4/2011 | Hampden-Smith et al. | |
| 8,226,213 B2 | 7/2012 | Mcavoy et al. | |
| 8,257,612 B2 | 9/2012 | Hampden-Smith et al. | |
| 9,164,575 B2 | 10/2015 | Argoitia et al. | |
| 9,458,324 B2 | 10/2016 | Argoitia et al. | |
| 9,517,622 B2 | 12/2016 | Kuramochi et al. | |
| 2012/0125229 A1 | 5/2012 | Gruener et al. | |
| 2012/0287213 A1 | 11/2012 | Engel et al. | |

(Continued)

FOREIGN PATENT DOCUMENTS

| | | |
|---|---|---|
| EP | 0341002 | 11/1989 |
| EP | 0601483 | 6/1994 |
| EP | 0686675 | 12/1995 |

(Continued)

OTHER PUBLICATIONS

G. Pfaff and P. Reynders, "Angle-Dependent Optical Effects Deriving from Submicron Structures of Films and Pigments," Chem. Rev. 99 (1999), pp. 1963-1981.

Koen Binnemans (Editor), "Handbook on the Physics and Chemistry of Rare Earths," vol. 35, Chapter 225, 2005, p. 145-153.

Mizoguchi et al., "Strong Near-Infrared Luminescence in BaSnO₃," J. Am. Chem. Soc. 2004, 126, pp. 9796-9800.

R. L. van Renesse, "Optical Document Security," 3rd Edition, 2005, pp. 115-117.

J.M. Adams and P.A. Dolin, "Printing Technology," Delmar Thomson Learning, 5th Edition, 2002, pp. 293-328.

K. Benes, P. Tong, and B. J. Ackerson, "Sedimentation, Peclet number, and hydrodynamic screening," Physical Review E, 76, 2007, pp. 056302-1-056302-7.

(Continued)

Primary Examiner — Thinh H Nguyen
(74) Attorney, Agent, or Firm — Muncy, Geissler, Olds & Lowe, P.C.

(57) ABSTRACT

To print a security feature on a medium a method is suggested, comprising inkjet printing an ink including one or more pigments, wherein at least one pigment satisfies the formula $$\frac{\pi \Delta \rho g d^4}{12\, k_B T} > 1$$

and whereas $\Delta \rho$ is the density difference between pigment and ink vehicle; g is the earth acceleration constant; d is the pigment particle diameter D90; $k_B$ is the Boltzmann constant; and T is the temperature. Inkjet printing of the ink is performed by a flextensional ink jet print head structure and printing is performed to provide one or more security features on the medium.

10 Claims, No Drawings

(56) References Cited

U.S. PATENT DOCUMENTS

| | | | |
|---|---|---|---|
| 2014/0035995 A1* | 2/2014 | Chou | B41J 2/01 347/20 |
| 2014/0291495 A1 | 10/2014 | Fischer et al. | |

FOREIGN PATENT DOCUMENTS

| | | |
|---|---|---|
| EP | 0966504 | 12/1999 |
| EP | 0985007 | 3/2000 |
| EP | 1046692 | 10/2000 |
| EP | 1071559 | 1/2001 |
| EP | 1213338 | 6/2002 |
| EP | 2038372 | 3/2009 |
| EP | 2402401 | 1/2012 |
| EP | 2621736 | 8/2013 |
| EP | 2867027 | 5/2015 |
| WO | 2001051571 | 7/2001 |
| WO | 2002073250 | 9/2002 |
| WO | 2003000801 | 1/2003 |
| WO | 2006063926 | 6/2006 |
| WO | 2007060133 | 5/2007 |
| WO | 2007131833 | 11/2007 |
| WO | 2008033059 | 3/2008 |
| WO | 2008083894 | 7/2008 |
| WO | 2008092522 | 8/2008 |
| WO | 2010115986 | 10/2010 |
| WO | 2010149266 | 12/2010 |
| WO | 2012084097 | 6/2012 |

OTHER PUBLICATIONS

R.H. Leach and R.J. Pierce, "The Printing Ink Manual," Springer Edition, 5th Edition, 2008, pp. 58-62.

R.H. Leach and R.J. Pierce, "The Printing Ink Manual," Springer Edition, 5th Edition, 2008, p. 74.

International Search Report and Written Opinion issued with respect to Application No. PCT/EP2018/066416 dated Sep. 19, 2018, 10 pages.

* cited by examiner

PRINTING OF SECURITY FEATURES

BACKGROUND OF THE INVENTION

1. Field of Invention

This invention relates to a process and a system for printing security features.

2. Description of Related Art

With the constantly improving quality of color photocopies and printings and in an attempt to protect security documents such as e.g. banknotes, value documents or cards, transportation tickets, tax banderols, and product labels against counterfeiting, falsifying or illegal reproduction, it is known to incorporate various security features in these documents. Typical examples of security features include security threads or stripes, windows, fibers, planchettes, foils, decals, holograms, watermarks, as well as security features printed with security inks. Said security inks contain selected compounds able to confer to the printed security features specific properties, such as magnetic properties, IR-absorbing properties, optically variable properties, light polarization properties, luminescent properties, conductive properties and combinations thereof.

The compounds in security inks should usually fulfill one or more of the following requirements:
  High resistance towards chemicals (such as laundry chemicals) and polluted air
  High resistance against wear and tear (for example to resist banknote circulation)
  Constant signal intensity over time (e.g. luminescent, conductive or magnetic compounds)
  Color variation that is easily observable with an untrained eye and does not degrade over time (optically variable pigments)

To fulfill these requirements, it can be of advantage that said compounds are used under the form of pigments, i.e. particles that exhibit a very low solubility in the matrix of the ink and are characterized by specific solid-state properties such as particle size, particle size distribution or morphology. Such pigments usually display a rather large particle size, typically in the micrometer range, as well as a wide particle size distribution (characterized by their D50 or D90 values, obtained using well-known measurement methods such as laser diffraction or differential sedimentation analysis).

Printing processes known in the art to print security inks containing one or more of said pigments are for example offset printing, screen printing, rotogravure printing, flexography printing and intaglio printing.

Offset printing is a process characterized by transferring a viscous (or pasty) ink from a printing plate to a blanket and then applying the ink on an article or a substrate. In a conventional offset printing process, the printing plate is damped, usually with a water or fountain solution, before it is inked. In such a conventional process, water forms a film on the hydrophilic areas (i.e. the non-image areas) of the printing plate but contracts into tiny droplets on the water-repellent areas (i.e. the image areas). When an inked roller is passed over the damped printing plate, it is unable to ink the areas covered by the water film but it pushes aside the droplets on the water-repellant areas and these ink up. Dry offset printing, also referred in the art as offset letterpress or letterset printing, combines features of both letterpress and lithographic printing. In such a process, the image is raised—as in letterpress—but is offset on to a rubber blanket before printing onto the substrate.

Screen printing is a stencil process whereby a liquid ink is transferred to a surface through a stencil supported by a fine mesh/porous fabric and/or metal. Screen printing is further described for example in The Printing ink manual, R. H. Leach and R. J. Pierce, Springer Edition, 5th Edition, pages 58-62 and in Printing Technology, J. M. Adams and P. A. Dolin, Delmar Thomson Learning, 5th Edition, pages 293-328.

Rotogravure/gravure is a printing process wherein the image elements are engraved into the surface of a cylinder, often metal cylinder. Prior to printing, the entire surface of said cylinder is inked and flooded with a liquid ink. The ink in excess is removed from the non-image area by a wiper or a blade before printing, so that ink remains only in the cells corresponding to the engravings of the cylinder. The image is transferred from the cells to the substrate by a pressure and by the adhesive forces between the substrate and the ink.

Flexography preferably uses a unit with a doctor blade, preferably a chambered doctor blade, an anilox roller and a plate cylinder, which carries the image elements to be transferred to the substrate. The anilox roller advantageously has small cells that fill up with a liquid ink and whose volume and/or density determines the ink application rate. The doctor blade lies against the anilox roller, and scraps off surplus ink at the same time. The anilox roller transfers the ink to the plate cylinder which finally transfers the ink to the substrate. Plate cylinders can be made from polymeric or elastomeric materials.

Intaglio printing is referred in the art also as engraved copper plate printing and engraved steel die printing. During intaglio printing processes, an engraved steel cylinder carrying a plate engraved with a pattern or image to be printed is supplied with a viscous (or pasty) ink coming from one or more inking cylinders (or chablon cylinders), each inking cylinder being inked in at least one corresponding color to form security features. Subsequent to the inking, any excess of said pasty ink on the surface of the intaglio printing plate is wiped off by a rotating wiping cylinder such as for example a polymeric roll. The remaining ink in the engraving of the printing cylinder is transferred under pressure onto the substrate to be printed while the wiping cylinder is cleaned by a wiping solution. Other wiping techniques can also be used, such as paper wiping or tissue wiping ("calico"). Subsequently to the wiping step, the inked intaglio plate is brought into contact with the substrate and the ink is transferred under pressure from the engravings of the intaglio printing plate onto the substrate to be printed forming a thick printing pattern of raised lines on the substrate. Intaglio printing is further described for example in The Printing ink manual, R. N. Leach and R. J. Pierce, Springer Edition, 5th Edition, page 74 and in Optical Document Security, R. L. van Renesse, 2005, 3rd Edition, pages 115-117.

All these known printing processes imply the time-consuming and costly fabrication of a master roll (such as the engraved steel die of the intaglio printing process or the engraved metal cylinder of the rotogravure printing process) that carries the design to be transferred onto the substrate. They therefore lack low cost, versatility and easy variability.

SUMMARY

In accordance with one aspect of the invention, it is provided a method for printing a security feature on a medium comprising inkjet printing an ink including one or more pigments, wherein at least one pigment satisfies the formula $$\frac{\pi \Delta \rho g d^4}{12 k_B T} > 1$$

whereas
Δρ ... density difference between pigment and ink vehicle
g ... earth acceleration constant
d ... pigment particle diameter D90;
$k_B$ ... Boltzmann constant; and
T ... absolute temperature
wherein inkjet printing of the ink is performed by a flextensional ink jet print head structure; and printing is performed to provide one or more security features on the medium.

Further it is provided a printing system for printing a security feature according to an aforementioned method, comprising
a flextensional ink jet print head structure for printing an ink, an ink including one or more pigments,
wherein at least one pigment satisfies the formula $$\frac{\pi \Delta \rho g d^4}{12 k_B T} > 1$$

whereas
Δρ ... density difference between pigment and ink vehicle
g ... earth acceleration constant
d ... pigment particle diameter D90;
$k_B$ ... Boltzmann constant; and
T ... absolute temperature

DETAILED DESCRIPTION

The present invention will be described for the sake of better understanding by way of exemplary embodiments.

The method for printing a security feature on a medium according to the invention comprises inkjet printing an ink including one or more pigments, wherein at least one pigment satisfies the formula $$\frac{\pi \Delta \rho g d^4}{12 k_B T} > 1$$

whereas
Δρ ... density difference between pigment and ink vehicle
g ... earth acceleration constant (9.81 m/s²)
d ... pigment particle diameter D90;
$k_B$ ... Boltzmann constant (1.381·10⁻²³ J/K); and
T ... absolute temperature wherein inkjet printing of the ink is performed by a flextensional ink jet print head structure; and printing is performed to provide one or more security features on the medium.

As used herein, the term "pigment" refers to a plurality of particles that have low to very low solubility in an ink medium and are characterized by their shape (needles, flakes, spheres ...), their size and their size distribution (D50, D90 ...), their solid-state properties (magnetism, visible and NIR absorption, luminescence ...) and/or other properties related to their solid nature.

According to the invention, one or more pigments may be present in the ink, whereby said one or more pigments may differ in their properties as described above.

The above formula (based on the so called Peclet number, as described for example in Sedimentation, Peclet number, and hydrodynamic screening, K. Benes, P. Tong, and B. J. Ackerson, *Physical Review E* 76, 056302 (2007)) may be interpreted as the ratio between the sedimentation energy $E_{sed}$ of a particle in a fluid and its thermal energy $E_{therm}$ due to Brownian motion $$Pe \text{ (Peclet number)} = \frac{E_{sed}}{E_{therm}}$$

$E_{sed}$ represents the energy gained by a particle of mass $m_p$ when settling in a fluid at a distance a equal to its radius in the gravity field g:

$$E_{sed} = (m_p - m_f) g a$$

$m_f$ being the mass of the fluid displaced by the particle. Since the displaced volume of fluid is equal to the volume of the particle $V_p$, the sedimentation energy becomes $$E_{sed} = (V_p \rho_p - V_p \rho_f) g a = V_p (\rho_p - \rho_f) g a = V_p \Delta \rho g a$$

Δρ being the density difference between the particle and the fluid. If the particle is approximated to a spherical particle of radius a, the expression above becomes $$E_{sed} = \frac{4\pi}{3} a^3 \Delta \rho \, g \, a = \frac{4\pi}{3} \Delta \rho \, g \, a^4$$

$E_{therm}$ (the energy provided by Brownian motion) is expressed by $$E_{therm} = k_B T$$

$k_B$ being the Boltzmann constant and T the absolute temperature.
The Peclet number Pe above becomes $$Pe = \frac{4\pi \Delta \rho \, g \, a^4}{3 k_B T}$$

If the diameter d=2a of the pigment particle as obtained from particle size measurements is used, the equation becomes:

$$Pe = \frac{\pi \Delta \rho \, g \, d^4}{12 k_B T}$$

Δρ is in this case the density difference between the pigment and the ink vehicle. If the Peclet number is bigger than 1, it means that the motion of the pigment particle in the ink vehicle will be governed more by sedimentation than by Brownian motion. If this number is much bigger than 1, it means that the particle motion will be solely governed by sedimentation.

Sedimentation and clogging of the nozzles of the print heads occur mainly due to the biggest particles present in the ink. Therefore, the particle diameter D90 has been used as the particle diameter d since, by definition, 90% of the pigment particles present in the ink are smaller than or equal to this value. The particle diameter D90 (as well as the median particle diameter D50) of the one or more pigments is measured using measurement methods well-known in the art, such as laser diffraction or differential sedimentation. Laser diffraction measurements are carried out according to ISO 13320, whereas differential sedimentation measurements are carried out according to ISO 13318.

As described, ink jet printing is performed by using a flextensional ink jet print head structure. Such structures, which fall under the general class of ink jet print heads, are known from the art.

Usually, flextensional transducers include a body or substrate, a flexible membrane having an orifice defined therein, and an actuator. The substrate defines a reservoir for holding a supply of flowable material and the flexible membrane has a circumferential edge supported by the substrate. The actuator may either be piezoelectric (i.e. it includes a piezoelectric material which deforms when an electrical voltage is applied), or thermally activated, such as described for example in U.S. Pat. No. 8,226,213 B2. As such, when the material of the actuator deforms, the flexible membrane deflects causing a quantity of flowable material to be ejected from the reservoir through the orifice.

For example, U.S. Pat. No. 5,828,394 from Stanford University describes a flextensional print head structure. A fluid ejector is disclosed which includes one wall including a thin elastic membrane having an orifice defining a nozzle and elements responsive to electrical signals for deflecting the membrane to eject drops of fluid from the nozzle.

Another example for a flextensional print head structure is described in U.S. Pat. No. 6,394,363. This device utilizes for example excitation of the surface layers incorporating nozzles which are arranged over one surface layer with addressability, forming a liquid projection array, capable of operation at high frequencies with a wide range of liquids.

Yet another example can be found in U.S. Pat. No. 9,517,622, which describes a liquid droplet forming apparatus comprising a film member configured to be vibrated so as to eject liquid held in a liquid holding unit, wherein a nozzle is formed in the film member. Further it is provided a vibrating unit to vibrate the film member; and a driving unit to selectively apply an ejection waveform and a stirring waveform to the vibrating unit.

U.S. Pat. No. 8,226,213 B2 describes a method of actuating a thermal bend actuator having an active beam fused to a passive beam. The method comprises passing an electrical current through the active beam so as to cause thermoelastic expansion of the active beam relative to the passive beam and bending of the actuator. Short actuation pulses of 0.2 µs or less are used to trigger drop formation.

The above described flextensional print head structures are examples only and should not be understood in a limiting way. Every other flextensional print head structure or even several printhead structures can be also used according to the invention.

The flextensional print heads have the advantage, as ink jet print heads in general, that printing can be done in a contactless way, relatively fast and that the printing process is very flexible and the printed pattern is easily variable. Especially the possibility of customizing the printed pattern for each single printed item (for example a banknote or the front page of a passeport) should be noted.

As mentioned hereabove, the pigments used according to the invention described herein generally have a large particle size and/or a high density, making them prone to sediment in an ink. Surprisingly it could be found that by using a flextensional print head structure, the particles do not tend to sediment, but instead rather stay dispersed in the ink.

The ink compositions, which are according to a preferred embodiment of the invention security ink compositions, that may be printed using such flextensional print heads are selected from the group consisting of low viscosity aqueous inks, low viscosity solvent-based inks, low viscosity radiation-curable inks and low viscosity dual-cure inks.

Low viscosity, according to this description should define, that the viscosity of the inks suitable to be printed using the printing process as described according to the invention should be less than about 30 mPas, preferably less than about 25 mPas, and even more preferably less than about 20 mPas at $1000\ s^{-1}$ and 25° C., when determined at 25° C. using a rotational viscosimeter DHR-2 from TA Instruments, having a cone-plane geometry and a diameter of 40 mm.

Low viscosity aqueous (or waterborne) inks, preferably security inks, suitable for the printing process described herein may according to a preferred embodiment comprise water, one or more resins, one or more wetting agents, one or more surfactants, one or more security pigments and one or more additives. Their general composition is given in the following table:

| Ingredients | Quantity (wt-%) |
|---|---|
| Water (demineralized) | 30-95 |
| Water-soluble or water-dispersible resins | 1-30 |
| Wetting agents | 0.1-10 |
| Surfactants | 0.1-10 |
| Security pigments | 0.5-60 |
| Other additives | 0.1-10 |

The one or more resins may be water-soluble and/or water-dispersible resins. Water-soluble resins include for example anionic polyacrylates, polyvinyl alcohol, poly(ethylene glycol), polyvinyl pyrrolidone, polyethyleneimines, modified starch, cellulose esters or ethers (such as cellulose acetate and carboxymethyl cellulose), as well as copolymers and combinations thereof. Water-dispersible resins include for example vinyl copolymer dispersions, acrylic dispersions, polyurethanes dispersions, acrylic-polyurethane dispersions and the like. These dispersions are often referred as "latex" dispersions and the corresponding inks as latex inkjet inks.

The role of the one or more resins is usually to enhance colloidal stability of the pigment particles in the ink, improve mechanical and chemical resistance properties as well as to provide adhesion of the ink layer to the substrate.

The one or more wetting agents may enhance the dispersion of the pigment in the ink and avoid re-agglomeration and sedimentation once the pigment particles are dispersed.

The one or more surfactants are used, inter alia, to decrease the static surface tension of the ink, which should be lower than about 40 mN/m, preferably lower than about 35 mN/m, more preferably lower than about 30 mN/m and even more preferably lower than 25 mN/m in order to ensure a good wetting of the substrate and a good drop formation upon ink jetting. The static surface tension is measured using a force tensiometer equipped with a Wilhelmy plate.

The one or more additives may include preservatives, humectants (such as glycerine), co-solvents (such as ethyleneglycol or other glycols), anti-foaming agents, fillers (such as pyrogenic silica), pH-control agents and standard color-imparting pigments. They also may include forensic markers and/or taggants.

The density of the ink vehicle (i.e. all components of the ink except the one or more pigments) is essentially depending on the amount of water contained in the ink, i.e. it is between about 1000 kg/m$^3$ and about 1100 kg/m$^3$.

Once printed on a desired substrate and/or medium, the water contained in the ink is partially absorbed by the substrate or medium, respectively, and partially evaporated using a hot air tunnel and/or infrared heaters.

Since at least a part of the ink vehicle (water) has to be absorbed by the substrate, said substrate is preferably chosen from the group consisting of substrates made of porous materials and substrates comprising a dedicated ink-receptive layer.

Substrates made of porous materials typically include paper or other fibrous materials (including woven and non-woven fibrous materials), as well as composite materials. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of composite materials include multilayer structures or laminates made of at least one bottom plastic or polymer layer and at least one top paper layer (such as Durasafe® from Landqart, which features a polyamide layer sandwiched between two cotton paper layers), as well as plastic and/or polymer fibers incorporated in a paper-like or fibrous material such as those described here above.

Substrates comprising a dedicated ink-receptive layer are made of at least one bottom layer made of either porous or non-porous materials, or a blend or combination thereof, and at least one top layer comprising porous materials. If the at least one bottom layer is made of porous materials, said porous materials are the same as described here above. If it is made of non-porous materials, said non-porous materials include glasses, metals, ceramics, plastics and polymers, metallized plastics or polymers. Typical examples of plastics and polymers include polyolefins such as polyethylene (PE) and polypropylene (PP) including biaxially oriented polypropylene (BOPP), polyamides, polyesters such as poly (ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical example of metals include without limitation aluminum (Al), chromium (Cr), copper (Cu), gold (Au), silver (Ag), alloys thereof and combinations of two or more of the aforementioned to metals. The metallization of the plastic or polymer materials described hereabove may be done by an electrodeposition process, a high-vacuum coating process or by a sputtering process.

The top ink-receptive layer is usually added to the bottom layer in a separate step via printing or coating. It contains either porous particles aimed at absorbing the water contained in the ink, one or more binders, and optional additives, or polymers that absorb water and swell upon impact of ink drops.

Porous particles include metal oxides such as aluminum oxide (such as γ-alumina), aluminum oxide/hydroxide (such as pseudo-boehmite), titanium dioxide (rutile or anatase), zinc oxide or silica (fumed or precipitated), carbonates (such as calcium carbonate or sodium aluminium carbonate), silicates (e.g. magnesium silicate, aluminum silicate), sulfates (such as barium sulphate) and combinations thereof. If transparency of the ink-receptive layer is mandatory, the use of porous particles made of a material with low refraction index and small particle size (such as fumed silica or pseudo-boehmite) is preferable. The one or more binders include gelatin, polyvinyl alcohol, derivatives of polyvinyl alcohol, polyvinyl pyrrolidone and mixtures thereof. The amount of binder is between about 5 wt-% and about 100 wt-% of the amount of porous particles, preferably between about 10 wt-% and 50 wt-%, and more preferably between about 15 wt-% and about 30 wt-%. One of the additives known to someone skilled in the art is boric acid, that acts as an efficient crosslinker for the above-mentioned polymers.

Polymers that swell with water include for example polyvinyl alcohol, modified polyvinyl alcohol, gelatine, starch, carboxymethyl cellulose, hydroxyethyl cellulose, hydroxypropyl cellulose, hydroxymethyl cellulose, methoxyethyl cellulose, gum arabic, polyvinyl pyrrolidone, polyvinyl-methyl pyrrolidone, polyacrylic acid, polyacryl amide, cationic polymers such as quaternised polyvinyl pyridine, and combinations thereof. Swelling helps fixing the ink dots and avoiding ink run-off. Water then slowly evaporates (eventually aided by passing the printed substrate into a hot air tunnel) and the layer thickness gets back to its nominal value (i.e. its value before printing).

Substrates specifically produced for inkjet printing are usually composite substrates that possess at least a core of paper or paper-like material, and two layers of non-absorbing polymer (such as polyethylene or PET) on both sides of the paper core. The ink-absorptive layer has described hereabove may be present on one or both sides of the substrate.

Additionally, and in certain cases, a primer layer may be present between the one or more bottom layers and the ink-receptive layer, in order to enhance adhesion. Alternatively, the one or more bottom layers may be treated by electrostatic discharge (corona) before coating or printing of the ink-receptive layer for the same purpose.

Low viscosity solvent-based inks, preferably security inks, suitable for the printing process described herein preferably comprise one or more organic solvents, one or more resins (or resins), one or more wetting agents, one or more security pigments and one or more additives. Their general composition is given in the following table:

| Ingredients | Quantity (wt-%) |
|---|---|
| Organic solvents | 30-95 |
| Resins | 1-30 |
| Wetting agents | 0.1-5 |
| Security pigments | 0.5-60 |
| Other additives | 0.1-10 |

The one or more solvents used according to this preferred embodiment of the invention include for example alcohols (such as ethanol), ketones (such as methyl ethyl ketone), esters (such as ethyl acetate or propyl acetate), glycol ethers (such as DOWANOL DPM) or glycol ether esters such as butyl glycol acetate and the like.

The one or more resins for solvent-based inks include for example nitrocellulose, methyl cellulose, ethyl cellulose, cellulose acetate, polyvinylbutyrals, polyurethanes, polyacrylates, polyamides, polyesters, polyvinyl acetate, rosin modified phenolic resins, phenolic resins, maleic resins, styrene-acrylic resins, polyketone resins, and the like.

The one or more wetting agents are used to preferably stabilize the pigment particles in the ink and to increase the interaction between the pigment particles and the resin matrix once the one or more solvents have evaporated.

After printing, the printed substrate might further be conveyed to a hot air and/or an infrared tunnel and the one or more solvents are evaporated by passing through this tunnel. Simultaneously with the evaporation of the one or more solvents, the thickness of the printed layer shrinks and the polymers contained in the one or more resins begin to harden, leading to a strong increase of viscosity that allows safe handling of the printed substrate ("dry-to-touch" state). The polymer matrix continues to harden in the dark, albeit at a slower pace.

The one or more additives may include preservatives, levelling agents, plasticizers, fillers (such as pyrogenic silica) and standard color-imparting pigments. They also may include forensic markers and/or taggants.

The density of the ink vehicle (i.e. all components of the ink except the one or more pigments) is essentially depending on the solvents contained in the ink, i.e. it is between about 800 kg/m$^3$ and about 1000 kg/m$^3$.

As for the low viscosity aqueous inks, the static surface tension of the low viscosity solvent-based inks should be lower than about 40 mN/m, preferably lower than about 35 mN/m, more preferably lower than about 30 mN/m and even more preferably lower than 25 mN/m in order to ensure a good wetting of the substrate and a good drop formation upon ink jetting.

Since drying of solvent-based inks is usually mainly obtained through evaporation of the one or more solvents, non-porous as well as porous substrates as discussed previously for the low viscosity aqueous inks may be used with solvent-based inks. In certain cases, a specific ink-receptive layer may be present. Alternatively, the substrate may be treated by electrostatic discharge (corona) before printing to enhance adhesion between the dried ink layer and said substrate.

Low viscosity radiation-curable inks, preferably security inks, suitable which may be used according to yet another embodiment of the invention preferably comprise one or more radiation-curable monomers, one or more radiation-curable oligomers, one or more photoinitiators, one or more wetting agents, one or more security pigments and one or more additives. Their general composition is given in the following table:

| Ingredients | Quantity (wt-%) |
| --- | --- |
| Monomers | 5-70 |
| Oligomers/prepolymers | 5-70 |
| Photoinitiators | 1-15 |
| Wetting agents | 0.1-5 |
| Security pigments | 0.5-60 |
| Other additives | 0.1-10 |

The one or more monomers and the one or more oligomers/pre-polymers used in the ink composition are polymerized to be solidified by the function of the one or more photoinitiators when being submitted to radiation, and are not otherwise limited. For example, various monomers and oligomers having a monofunctional group, a bifunctional group, or a trifunctional or more polyfunctional group can be used. Polymerization may be performed by electron beam (EB)-curing or UV-curing. Preferably, polymerization is performed by UV-curing with LED (light-emitting diodes) and the one or more photoinitiators are chosen accordingly. The number of LEDs is not limited to one, and a plurality of LEDs may be used so as to emit light having a plurality of emission peak wavelengths.

The one or more additives may include one or more sensitizers, one or more polymerization inhibitors, one or more surfactants, as well as preservatives, levelling agents, plasticizers, fillers (such as pyrogenic silica) and standard color-imparting pigments. They also may include forensic markers and/or taggants.

The density of the ink vehicle (i.e. all components of the ink except the one or more pigments) is essentially depending on the mixture of monomers/oligomers present in the ink. It is usually comprised between about 1100 kg/m$^3$ and about 1300 kg/m$^3$.

The advantages of radiation-curing inks are that drying is usually almost instantaneous and no volatile components are released. The layer thickness is almost the same after curing, which can create difficulties for high-aspect ratio security pigments that need alignment along the substrate, such as optically-variable pigments (OVP®), since they tend to keep random orientation upon curing.

As in the case of solvent-based inks, any type of substrate (porous or non-porous) may be used with radiation-curable inks without limitation. The substrate may be treated by electrostatic discharge (corona) before printing to enhance adhesion between the cured ink layer and said substrate.

Low viscosity dual-cure inks, preferably security inks, according to yet another embodiment of the invention comprise preferably the same ingredients as radiation-curing inks, and one or more solvents.

| Ingredients | Quantity (wt-%) |
| --- | --- |
| Solvents | 5-50 |
| Monomers | 5-50 |
| Oligomers | 5-50 |
| Photoinitiators | 2-7 |
| Wetting agents | 0.1-5 |
| Security pigments | 0.5-60 |
| Other additives | 0.1-10 |

The one or more solvents are usually evaporated by conveying the printed substrate to a hot air tunnel and/or infrared heaters, then the radiation-curing part of the ink is cured, preferably by UV curing using UV-LEDs. The ink layer shrinks more or less according to the amount of solvents present in the ink, thus leading to flat orientation of high-aspect ratio pigments.

The density of the ink vehicle (i.e. all components of the ink except the one or more pigments) is essentially depending on the mixture of monomers/oligomers and on the solvents present in the ink. It is usually comprised between about 900 kg/m$^3$ and about 1100 kg/m$^3$.

As in the case of low viscosity solvent-based inks and low viscosity radiation-curable inks, any type of substrate/medium (porous or non-porous) may be used with low viscosity dual-cure inks without limitation. The substrate may be treated by electrostatic discharge (corona) before printing to enhance adhesion between the cured ink layer and said substrate.

The one or more pigments, preferably security pigments, suitable to be used for the invention are chosen such as to confer to the security inks printed according to the printing process described herein properties selected from the group consisting of magnetic properties, IR-absorbing properties, optically variable properties, light polarization properties, luminescent properties, conductive properties and combinations thereof.

Magnetic pigments, suitable to be used according to a preferred embodiment of the invention, are widely used as marking materials in security applications and have been used since long in the field of banknote printing, to confer to the printed currency a covert security feature, i.e. a security feature that is detectable using a detecting and/or measuring device, in this case magnetic detectors such as the ones used by commercial banks for high-speed sorting of banknotes. Magnetic pigments exhibit particular, detectable magnetic properties of the ferromagnetic or ferrimagnetic type and include permanent magnetic pigments (made of hard-magnetic materials with coercivity Hc>1000 Nm) and magnetizable pigments (made of soft-magnetic materials with coercivity Hc≤1000 A/m according to IEC60404-1 (2000)). Typical examples of magnetic materials include iron, nickel, cobalt, manganese and their magnetic alloys, carbonyl iron, chromium dioxide $CrO_2$, magnetic iron oxides (e.g. $Fe_2O_3$; $Fe_3O_4$), magnetic ferrites $M(II)Fe(III)_2O_4$ and hexaferrites $M(II)Fe(III)_{12}O_{19}$, the magnetic garnets $M(II)_3Fe(III)_5O_{12}$ (such as yttrium iron garnet $Y_3Fe_5O_{12}$) and their magnetic isostructural substitution products and materials with permanent magnetization (e.g. $CoFe_2O_4$). Magnetic pigments comprising a magnetic core material which is surrounded (coated) by at least one layer of another material such as those described in WO 2010/115986 A2 may also be used for the present invention.

Another possibility is the use of infrared (IR) absorbing pigments, i.e. pigments made of materials absorbing in the near-infrared (NIR) range of the electromagnetic spectrum, most generally in the 700 nm to 2500 nm wavelength range. They are widely known and used as marking materials in security applications to confer to the printed documents a covert security element which helps their authentication. For example, security features having IR-absorbing properties have been implemented in banknotes for use by automatic currency processing equipment, in banking and vending applications (automatic teller machines, automatic vending machines, etc.), in order to recognize a determined currency bill and to verify its authenticity, in particular to discriminate it from replicas made by color copiers. IR absorbing materials include IR absorbing inorganic materials, glasses comprising substantial amounts of IR-absorbing atoms or ions or entities which display IR-absorption as a cooperative effect, IR absorbing organic materials and IR absorbing organometallic materials (complexes of cation(s) with organic ligand(s), wherein either the separate cation and/or the separate ligand, or both in conjunction, have IR-absorbing properties). Typical examples of IR absorbing materials include among others carbon black, quinone-diimmonium or aminium salts, polymethines (e.g. cyanines, squaraines, croconaines), phthalocyanine or naphthalocyanine type (IR-absorbing pi-system), dithiolenes, quaterrylene diimides, metal (e.g. transition metals or lanthanides) phosphates, lanthanum hexaboride, indium tin oxide, doped indium tin oxide, antimony tin oxide and doped tin(IV) oxide (cooperative property of the $SnO_4$ crystal). IR absorbing materials comprising a transition element compound and whose infrared absorption is a consequence of electronic transitions within the d-shell of transition element atoms or ions such as those described in WO 2007/060133 A2 may also be used for the present invention.

Optically variable pigments are another option for use in another embodiment and exhibit a viewing-angle or incidence-angle dependent color. Optically variable pigments are widely used as marking materials in security applications and have been used since long in the field of banknote printing, to confer to the printed currency or document an overt security feature which is directly observable with the naked eye. Optically variable pigments are selected from the group consisting of thin film interference pigments, magnetic thin film interference pigments, interference coated pigments, magnetic interference coated pigments, optically variable cholesteric liquid crystal pigments, magnetic cholesteric liquid crystal pigments and mixtures thereof. Magnetic thin film interference pigments, magnetic cholesteric pigments and magnetic interference coated pigments have the advantage over their non-magnetic counterparts that they possess an additional, covert feature that may be sensed by electronic means known in the art to detect magnetic materials.

Thin film interference pigments are disclosed for example in U.S. Pat. Nos. 4,705,300; 4,705,356; 4,721,271; 5,084,351; 5,214,530; 5,281,480; 5,383,995; 5,569,535, 5,571,624 and in the thereto related documents. Preferably the thin film interference pigments comprise a Fabry-Perot reflector/dielectric/absorber multilayer structure and more preferably a Fabry-Perot absorber/dielectric/reflector/dielectric/absorber multilayer structure, wherein the absorber layers are partially transmitting and partially reflecting, the dielectric layers are transmitting and the reflective layer is reflecting the incoming light. Preferably, the reflector layer is selected from the group consisting of metals, metal alloys and combinations thereof, preferably selected from the group consisting of reflective metals, reflective metal alloys and combinations thereof and more preferably selected from the group consisting of aluminum (Al), chromium (Cr), nickel (Ni), and mixtures thereof and still more preferably aluminum (Al). Preferably, the dielectric layers are independently selected from the group consisting of magnesium fluoride ($MgF_2$), silicium dioxide ($SiO_2$) and mixtures thereof and more preferably magnesium fluoride ($MgF_2$). Preferably, the absorber layers are independently selected from the group consisting of chromium (Cr), nickel (Ni), metallic alloys and mixtures thereof and more preferably chromium (Cr). Particularly preferred is a Fabry-Perot absorber/dielectric/reflector/dielectric/absorber multilayer structure consisting of a $Cr/MgF_2/Al/MgF_2/Cr$ multilayer structure.

Yet another example, magnetic thin film interference pigments are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 A1 and in the documents cited therein. Preferably, the magnetic thin film interference pigments are pigments having a five-layer Fabry-Perot multilayer structure and/or are pigments having a six-layer Fabry-Perot multilayer structure and/or are pigments having a seven-layer Fabry-Perot multilayer structure.

Preferred five-layer Fabry-Perot multilayer structures comprise absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures comprise absorber/dielectric/reflector/magnetic/dielectric/absorber multilayer structures.

Preferred seven-layer Fabry Perot multilayer structures comprise absorber/dielectric/reflector/magnetic/reflector/dielectric/absorber multilayer structures such as disclosed in WO 2002/073250 A2.

Additionally, thin-film interference pigments and magnetic thin-film interference pigments may be used as taggants, in order to add a further, covert security feature to the printed currency or document. Such pigments possess, beside their already described color-shifting properties, a specific shape and/or specifically designed borders and/or a logo or an indicia that are observable only with strong magnification. Such pigments are described for example in U.S. Pat. No. 7,241,489 B2, U.S. Pat. No. 9,164,575 B2 and U.S. Pat. No. 9,458,324 B2.

Suitable interference coated pigments include structures comprising a substrate selected from the group consisting of metallic cores such as titanium, silver, aluminum, copper, chromium, iron, germanium, molybdenum, tantalum or nickel coated with one or more layers made of metal oxides as well as structure consisting of a core made of synthetic or natural micas, other layered silicates (e.g. talc, kaolin and sericite), glasses (e.g. borosilicates), silicium dioxides ($SiO_2$), aluminum oxides ($Al_2O_3$), titanium oxides ($TiO_2$), graphites and mixtures thereof coated with one or more layers made of metal oxides (e.g. titanium oxides, zirconium oxides, tin oxides, chromium oxides, nickel oxides, copper oxides and iron oxides), the structures described hereabove have been described for example in Chem. Rev. 99 (1999), G. Pfaff and P. Reynders, pages 1963-1981 and WO 2008/083894 A1. Typical examples of these interference coated pigments include without limitation silicium oxide cores coated with one or more layers made of titanium oxide, tin oxide and/or iron oxide; natural or synthetic mica cores coated with one or more layers made of titanium oxide, silicium oxide and/or iron oxide, in particular mica cores coated with alternate layers made of silicium oxide and titanium oxide; borosilicate cores coated with one or more layers made of titanium oxide, silicium oxide and/or tin oxide; and titanium oxide cores coated with one or more layers made of iron oxide, iron oxide-hydroxide, chromium oxide, copper oxide, cerium oxide, aluminum oxide, silicium oxide, bismuth vanadate, nickel titanate, cobalt titanate and/or antimony-doped, fluorine-doped or indium-doped tin oxide; aluminum oxide cores coated with one or more layers made of titanium oxide and/or iron oxide.

Suitable magnetic interference coated pigments include without limitation structures comprising a substrate selected from the group consisting of a core coated with one or more layers, wherein at least one of the core or the one or more layers have magnetic properties. Such pigments are described for example in EP 0 341 002 B2, EP 0 686 675 B1, WO 2010/149 266 A1 and WO 2012/084 097 A1. EP 0 341 002 B2 discloses magnetic interference coated pigments with optically variable characteristics, which comprise a substrate and a multilayered thin film metal-dielectric interference coating thereon, wherein the metal-dielectric interference coating comprises a reflecting metallic layer being of a material having magnetic as well as reflecting properties, such as a cobalt nickel alloy. EP 0 686 675 B1 describes magnetic interference coated pigments made of lamellar non-ferromagnetic metallic substrates being coated with a first ferromagnetic layer, a second layer of silica, alumina or their hydrates, a third layer of metal or of a metal oxide and optionally a fourth layer of a colorless or colored metal oxide. WO 2010/149 266 A1 discloses magnetic interference coated pigments having at least a transparent flaky substrate having two major surfaces and a coating comprising maghemite ($\gamma$-$Fe_2O_3$). Optional dielectric layers between the substrate and the maghemite layer and/or on top of said layer impart optically variable properties to the pigments. WO 2012/084 097 A1 discloses pigments similar to WO 2010/149 266 A1, wherein the maghemite layer is replaced by a first layer of hematite ($\alpha$-$Fe_2O_3$) and/or goethite ($\alpha$-FeO(OH)), and a second layer of magnetite ($Fe_3O_4$), the thickness of the layer composed of magnetite being larger than the thickness of the layer composed of hematite and/or goethite.

According to another embodiment of the invention, cholesteric liquid crystal pigments can be used, which are based on the specific properties of liquid crystals in the cholesteric phase, which exhibit a molecular order in the form of a helical superstructure perpendicular to the longitudinal axes of its molecules. The helical superstructure is at the origin of a periodic refractive index modulation throughout the liquid crystal material, which in turn results in a selective transmission/reflection of determined wavelengths of light (interference filter effect). Cholesteric liquid crystal pigments are made of cholesteric liquid crystal polymers that can be obtained by subjecting one or more crosslinkable substances (nematic compounds) with a chiral phase to alignment and orientation. The pitch (i.e. the distance over which a full rotation of 360° of the helical arrangement is completed) can be tuned in particular by varying selectable factors including the temperature and solvents concentration, by changing the nature of the chiral component(s) and the ratio of nematic and chiral compounds. Crosslinking under the influence of UV radiation freezes the pitch in a predetermined state by fixing the desired helical form so that the color of the resulting cholesteric liquid crystal materials is fixed, independently of external factors such as the temperature.

Cholesteric liquid crystal polymers may then be shaped to cholesteric liquid crystal pigments by subsequently comminuting the polymer to the desired particle size. Examples of coatings, films and pigments made from cholesteric liquid crystal materials and their preparation are disclosed for example in U.S. Pat. Nos. 5,211,877, 5,362,315, 6,423,246, EP 1 213 338 A1, EP 1 046 692 A1 and EP 0 601 483 A1.

Magnetic cholesteric liquid crystal pigments include without limitation magnetic monolayered cholesteric liquid crystal pigments and magnetic multilayered cholesteric liquid crystal pigments. Such pigments are disclosed for example in WO 2006/063926 A1, U.S. Pat. Nos. 6,582,781 and 6,531,221. WO 2006/063926 A1 discloses monolayers and pigments obtained therefrom with high brilliance and colorshifting properties with additional particular properties such as magnetizability. The disclosed monolayers and pigments, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigments which comprise the sequence A1/B/A2, wherein A1 and A2 may be identical or different and each comprises at least one cholesteric layer, and B is an interlayer absorbing all or some of the light transmitted by the layers A1 and A2 and imparting magnetic properties to said interlayer. U.S. Pat. No. 6,531,221 discloses platelet-shaped cholesteric multilayer pigments which comprise the sequence A/B and optionally C, wherein A and C are absorbing layers imparting magnetic properties, and B is a cholesteric layer.

In addition to the aforementioned properties, cholesteric liquid crystal pigments and magnetic cholesteric liquid crystal pigments may also display specific light polarization properties. Liquid crystals in the cholesteric phase exhibit a molecular order in the form of a helical superstructure perpendicular to the longitudinal axes of its molecules, whose sense of rotation depends on the chirality of said molecules. This helical molecular arrangement leads to cholesteric liquid crystal materials exhibiting the property of dispersing unpolarized incident light into circularly polarized light, i.e. the reflected light being left-hand or right-hand circularly polarized depending on the sense of rotation of the helices. Since the human eye is unable to sense the polarization state of light, the security feature containing cholesteric liquid crystal pigments is observed through a simple circularly polarized filter or using a specifically designed electronic device.

It should be noted that the optically variable properties of the optically variable security pigments described here above are not limited to the visible range of the electromagnetic spectrum. For example, the optically variable security features obtained from them may exhibit, at least at one viewing angle, a different position of the selective reflection band and/or a different CIE (1976) color index parameter in the visible, IR (infrared) or UV (ultraviolet) ranges and/or colorshifting properties from the visible range to the IR range, or from the UV range to the visible range, or from the UV range to the IR range.

Luminescent materials can be used as markers in security applications. Luminescent materials may be for example inorganic (inorganic host crystals or glasses doped with luminescent ions), organic or organometallic (complexes of luminescent ion(s) with organic ligand(s)) substances. Luminescent materials can absorb certain types of energy in the electromagnetic spectrum, i.e. UV, VIS, and IR range, acting upon them and subsequently emit at least partially this absorbed energy as electromagnetic radiation. Luminescent materials are detected by exposing with a certain wavelength of light and analyzing the emitted light. Down-converting luminescent materials absorb electromagnetic radiation at a higher frequency (shorter wavelength) and at least partially re-emit it at a lower frequency (longer wavelength). Up-converting luminescent materials absorb electromagnetic radiation at a lower frequency and at least partially re-emit it at a higher frequency. Light emission of luminescent materials arises from excited states in atoms or molecules. Luminescent materials may be divided in: (i) phosphorescent materials wherein a time-delayed radiation emission is observable after the excitation radiation is removed (typically, with a decay lifetime from about 1 μs to about 100 s), and (ii) fluorescent materials wherein a prompt radiation emission upon excitation is observable (typically, with a decay lifetime below 1 μs). Both fluorescent and phosphorescent materials may be used in the security inks described herein. In the case of phosphorescent compounds, measurement of decay characteristics may also be carried out as additional authentication mean.

Luminescent pigments, which according to a preferred embodiment of the invention can be used in inks, have been described for example in U.S. Pat. No. 6,565,770, WO 2008/033059 A2 and WO 2008/092522 A1. Examples of luminescent pigments include among others oxides, sulfides, oxysulfides, phosphates, thiogallates, aluminates, borates, silicates, vanadates, titanates, etc. of non-luminescent cations, doped with at least one luminescent cation chosen from the group consisting of transition-metal and the rare-earth ions, such as e.g. those mentioned in EP 0 985 007 A1, U.S. Pat. No. 6,180,029 B1 or U.S. Pat. No. 7,476,411 B1; luminescent materials having multiple responses to excitation such as e.g. those disclosed in U.S. Pat. No. 8,257,612 B2. Typical examples of luminescent pigments include without limitation at least one lattice selected from the group consisting of yttrium compounds (preferably yttria, yttrium borate, yttrium phosphate, yttrium aluminate), lutetium compounds (preferably lutetium oxide and lutetium aluminate) lanthanum compounds (preferably lanthanum oxide, lanthanum oxysulfide, lanthanum phosphate, lanthanum aluminate, lanthanum borate and lanthanum silicate) and mixtures thereof and at least one lanthanide element dopant (preferably selected from the group consisting of ytterbium cations, erbium cations, thulium cations and mixtures thereof) such as those describe in U.S. Pat. No. 7,922,936 B2 and EP 2 038 372 B1. Other typical examples include lanthanide(III) chelate pigments, the term "chelate" as used herein defining a compound comprising one or more metal centers and one or more organic ligands that in turn provide coordination sites for metal bonding. Preferably, said lanthanide(III) chelate pigments comprise one or more organic ligands able to absorb UV light, such as those disclosed in the «Handbook on the Physics and Chemistry of rare earths», Vol. 35, chap. 225, p. 145-153, 2005. Other examples are found for example in U.S. Pat. No. 7,108,742 B2. A specific class of luminescent pigments are compounds that absorb in the UV-range and emit in the NIR- or IR-range. Such compounds are particularly desirable for security applications since they cannot be observed by the naked eye and need a special equipment both for excitation and emission detection, thus greatly enhancing the anticounterfeiting resistance of the security elements that contain them. Such compounds may be for example barium stannate pigments, who have been described by Mizoguchi et al. (*J. Am. Chem. Soc.* 2004, 126, 9796).

Common up-converting materials useful as pigments for the invention described herein are of inorganic nature and consist essentially of a crystal lattice in which rare-earth ions are present as activators and sensitizers. The excitation and emission characteristics of up-converting materials are inherent characteristics of the rare earth ions employed. Rare-earth ion luminescence activators have relatively longlived excited states and a particular electronic structure. This permits the energy of two or more photons in succession to be transmitted to one single luminescence center and cumulated there. An electron is thus promoted to a higher energy level than that corresponding to the incoming photon energy. When this electron returns from its higher level to the ground state, a photon having about the sum of the energies of the cumulated exciting photons is emitted. In this way it is possible to convert e.g. IR radiation into visible light. Alkali and alkaline earth metal halides, and the halides, oxyhalides and oxysulfides of yttrium, lanthanum and gadolinium are principally used as the host material, whereas e.g. $Er^{3+}$, $Ho^{3+}$ and $Tm^{3+}$ serve as the activators. Additionally, $Yb^{3+}$ and/or other ions can be present in the crystal lattice as sensitizers to increase the quantum yield. Up-converting pigments are described for example in WO 2001/051 571 A1, EP 2 621 736 A2 and EP 0 966 504 B1.

Another possible embodiment is the use of conductive pigments, which are used in the domain of security printing to confer to the document of value (e.g. banknote, passport, ID cards and the like) an additional, covert security feature. A security feature made of a security ink comprising one or more conductive pigments may be detected by simple detection devices, like electrode circuits that are contacted with said security feature. Advantageously, said detection devices comprise contactless electronic means, such as inductive or capacitive sensors. In the field of security, capacitive sensors are usually preferred because there are able to detect small conductive elements without interacting with the environment (substrate or surrounding hardware).

Conductive inks used according to a yet further embodiment of the invention contain for example conductive pigments made of non-conductive substrates, such as titanium oxides, synthetic or natural micas, other phyllosilicates, glasses, silicon dioxides or aluminum oxides that are enwrapped by a conductive layer. Preferred are conductive pigments that exhibit a high aspect ratio, also called leafing pigments, that orient themselves quickly after printing, such that their two longest dimensions are substantially parallel to the substrate surface, thus improving the conductivity of the security feature. Depending on the thickness of the high aspect ratio conductive pigments and the thickness of the printed ink layer, it is possible to obtain transparent or semi-transparent conductive security features that are easy to integrate into the design of the security document. U.S. Pat. No. 7,416,688 B2 discloses for example transparent conductive pigments of flake-form substrates coated with a conductive layer, wherein the number-weighted median particle area $F_{50}$ of the transparent conductive pigments is greater than or equal to 150 µm². Particularly preferred pigments comprise mica coated with an antimony-doped tin oxide layer, mica coated with a titanium oxide layer, a silicon oxide layer and antimony-doped tin oxide layer, or mica coated with an antimony-doped tin oxide layer and a metal oxide layer, in particular a titanium oxide layer.

Alternatively, and if high transparency is not mandatory, conductive inks printable used according in another example of the invention may contain high aspect ratio flakes made of one or more metals, such as aluminum, copper, nickel, iron, lead, zinc and tin, and alloys thereof.

Additionally, security features comprising the one or more conductive materials may contain one or more luminescent materials. The one or more luminescent materials are selected from the group consisting of luminescent molecules (that are homogeneously dissolved into the ink matrix), luminescent pigments (that are dispersed within said ink matrix), semi-conductor quantum dots (like CdSe, ZnS, ZnSe, CdZnSe, CdS, InAs, InP, CdSeS), luminescent polymers, and pigments that are surface-treated with a luminescent layer. Upon contact or non-contact (e.g. capacitive or inductive) electric stimulation, the one or more luminescent materials emit an electromagnetic radiation that may be visible to the naked eye and/or detected using electronic means known in the art. Such a security feature is described for example in US 2014/291 495 A1.

Typically, the median particle size D50 of the one or more pigments is from about 0.5 µm to about 30 µm, preferably from about 1 µm to about 20 µm, and more preferably from about 2 µm to about 10 µm. The particle size D90 is from about 1 µm to about 50 µm, preferably from about 2 µm to about 30 µm, and more preferably from about 5 µm to about 20 µm.

The printing process described herein is not limited by the density of the one or more pigments, as it is normally the case with standard inkjet printing heads. Typically, the density of optically variable pigments (including cholesteric liquid crystal pigments), magnetic or magnetizable thin-film interference pigments and interference-coated particles (pearlescent pigments) is between about $1.2 \cdot 10^3$ kg/m³ and about $4 \cdot 10^3$ kg/m³, the density of luminescent pigments is between about $3 \cdot 10^3$ kg/m³ and about $5 \cdot 10^3$ kg/m³, and the density of magnetic material or pigments, respectively is between about $5 \cdot 10^3$ kg/m³ and about $10^4$ kg/m³.

The concentration of the one or more security pigments is only limited by the viscosity of the ink, which has been discussed hereabove. For example, in an ink containing an optically variable pigment (OVP®), the concentration of said color-variable pigment is between about 2.5 wt-% and about 35 wt-%, depending on the desired visual effect. In an ink containing a magnetic pigment, the concentration of said magnetic pigment is between about 5 wt-% and about 60 wt-%, in order to get a strong enough magnetic signal, and in an ink containing a luminescent pigment, the concentration of said luminescent pigment is between about 2 wt-% and about 20 wt-%, depending on the desired emission intensity.

According to a preferred embodiment of the invention the security feature obtained using the printing process described herein is an overt security feature comprising one or more pigments selected from the group consisting of optically variable pigments (including cholesteric liquid crystal pigments), wherein at least one pigment satisfies the formula $$\frac{\pi \, \Delta \rho \, g \, d^4}{12 \, k_B T} > 1$$

whereas
Δρ ... density difference between pigment and ink vehicle
g ... earth acceleration constant
d ... pigment particle diameter D90;
$k_B$ ... Boltzmann constant; and
T ... absolute temperature
Preferably, $$1\,000\,000 > \frac{\pi \, \Delta \rho \, g \, d^4}{12 \, k_B T} > 10$$

According to another preferred embodiment of the invention the security feature obtained using the printing process described herein is a covert security feature comprising one or more pigments selected from the group consisting of magnetic pigments, magnetic thin film interference pigments, magnetic interference coated pigments, magnetic cholesteric liquid crystal pigments, luminescent pigments, conductive pigments and infrared-absorbing pigments, wherein at least one or more pigments satisfies the formula $$\frac{\pi \, \Delta \rho \, g \, d^4}{12 \, k_B T} > 1$$

whereas
Δρ ... density difference between pigment and ink vehicle
g ... earth acceleration constant
d ... pigment particle diameter D90;
$k_B$ ... Boltzmann constant; and
T ... absolute temperature
Preferably, $$1\,000\,000 > \frac{\pi \, \Delta \rho \, g \, d^4}{12 \, k_B T} > 10$$

Said overt and/or covert security features may be printed using the printing process described herein to form a bar code, a 2D-code (such as a QR-code), or alphanumeric insignia. In another embodiment, they may form a geometric shape (such as a regular or irregular polygone), a logo, an image or a random pattern.

The invention also relates to a system for printing security features according to any of the described methods. The system comprises hereby a flextensional ink jet print head structure for printing an ink, ink including one or more security pigments wherein at least one pigment satisfies the formula $$\frac{\pi \, \Delta\rho \, g \, d^4}{12 \, k_B T} > 1$$

whereas
Δρ . . . density difference between pigment and ink vehicle
g . . . earth acceleration constant
d . . . pigment particle diameter D90;
$k_B$ . . . Boltzmann constant; and
T . . . absolute temperature

EXAMPLES

The present invention is now discussed in more details with reference to non-limiting examples. The examples below provide more detail for the preparation and use of the ink-jet inks according to the invention.

The different inks as described in the examples have been printed with a tailor-made printer equipped with a single printhead with piezo electrically actuated flextensional nozzles. Its nozzles architecture is for example described in patent EP 1 071 559 B1. Morevover, in order to avoid pigment sedimentation, the printer is equipped with an inkfeed system dedicated to sedimenting pigments (e.g. described in patent EP 2 867 027 B1). Printing with the printhead was at least tested for four hours.

Example 1

TABLE 1a (OVP ®-containing low viscosity solvent-based ink) - composition

| Ingredients | Chemical composition | Quantity (wt-%) |
|---|---|---|
| Solvent 1 | Ethanol 95% (Brenntag) | 49 |
| Solvent 2 | Ethyl acetate 99-100% (Brenntag) | 15 |
| Solvent 3 | Dowanol DPM (Brenntag) | 15 |
| Resin 1 | Nitrocellulose (Dow Chemicals) | 9 |
| Resin 2 | Polyurethane (Siegwerk) | 3 |
| Wetting agent | Active polymeric dispersant (Lubrizol) | 1 |
| OVP ® [a] | VIAVI Solutions | 8 |

Wherein [a] is a cyan-to-purple optically variable pigment having a flake shape of size D50 about 15 μm, D90 about 24 μm, thickness about 1 μm and density about 2400 kg/m³. The particle size distribution was determined using a CI-LAS 1090 laser diffraction apparatus.

The density of the ink vehicle was measured with a calibrated BlauBrand® pycnometer following ISO 758:1976 (Liquid chemical products for industrial use—Determination of density at 20° C.) to be 870 kg/m³.

The Peclet number (Pe) was calculated from the particle size D90=2.4·10⁻⁵ m, the measured density 870 kg/m³ of the ink vehicle and the density 2400 kg/m³ of the pigment to be equal to about 320000 at room temperature.

The resins were added to the mixture of solvents and stirred at 45° C. until they were fully dissolved. The wetting agent was added, and finally the pigment was added and dispersed during 5 minutes at 3000 rpm using a Dispermat (LC220-12). The viscosity of the ink was 10.6 mPas at 1000 s⁻¹ and 25° C. The surface tension of the ink, measured using a force tensiometer (K11 from Kruss, equipped with a Wilhelmy plate) was 24.2 mN/m.

The so obtained OVP®-containing low viscosity solvent-based ink was printed using a flextensional printing head on HP Premium Plus photographic inkjet paper (PE-coated paper with an ink-receptive layer) to form a color-shifting QR code of dimensions 1 cm×1 cm.

The color-shifting properties of the ink were determined using a goniometer specifically developed for optically-variable inks (Goniospektrometer Codec WI-10 5&5 by Phyma GmbH Austria). The L*a*b* values of the printed patch were determined at two angles, respectively 0° to the normal (denoted below as orthogonal view in Table 1c below) with illumination at 22.5° and 67.5° to the normal (denoted below as grazing view in Table 1c below) with illumination at 45°. The h* and c* values shown in the tables below were calculated from the a* and b* values according to the CIELAB (1976) color space, wherein:

$$C^* = \sqrt{(a^*)^2 + (b^*)^2}$$

and $$h^* = tg^{-1}\left(\frac{a^*}{b^*}\right)$$

TABLE 1c (color-shifting properties of the IJ ink of Ex. 1) - Results

| | c* | h* |
|---|---|---|
| Orthogonal view | 37.0 | 230 |
| Grazing view | 28.7 | 41 |
| Color travel | | 189° |

The 1 cm×1 cm QR code could be easily read using an Apple SE smartphone equipped with the application i-nigma QR from 3GVision.

As it can be inferred from the results of Table 1c, the OVP®-containing low viscosity solvent-based ink of Example 1 yielded a striking color-shifting effect. Despite the high concentration of the OVP® in the ink (8 wt-%), its high density (2400 kg/m³) and its large particle size (D50=15 μm, D90=24 μm), the ink could be printed during several hours without clogging of the nozzles or sedimentation leading to reduced amounts of OVP® being deposited on the substrate.

Example 2

TABLE 2a (black magnetic low viscosity waterborne ink) - composition

| Ingredients | Chemical composition | Quantity (wt-%) |
|---|---|---|
| Resin | Acrylic resin (DSM) | 22.21 |
| Solvent 1 | Demineralized water | 45.17 |
| Solvent 2 | Glycerine (INTERFAT) | 8.88 |
| Base | Ammonium hydroxide 25% (Brenntag) | 0.89 |
| Anti-foaming agent | Polysiloxane (Evonik) | 1.04 |
| Wetting agent 1 | High-molecular weight acrylic block copolymer (BYK) | 1.45 |

TABLE 2a-continued (black magnetic low viscosity waterborne ink) - composition

| Ingredients | Chemical composition | Quantity (wt-%) |
|---|---|---|
| Wetting agent 2 | Active polymeric dispersant (Lubrizol) | 0.36 |
| Magnetic black pigment | MAGNETPIGMENT 340 [b] (BASF, CAS 1309-38-2) | 20 |

Wherein [b] is Magnetite $Fe_3O_4$ (CI Pigment Black 11), D50 about 6.5 μm, D90 about 12.5 μm, density 5200 kg/m$^3$, coercitive field strength 18 kA/m.

The density of the ink vehicle was measured as in Example 1 to be 1028 kg/m$^3$.

The Peclet number (Pe) was calculated from the particle size $D90=1.25 \cdot 10^{-5}$ m, the measured density 1028 kg/m' of the ink vehicle and the density 5200 kg/m$^3$ of the pigment to be equal to about 65000 at room temperature.

The resin was added to the solution comprising water, glycerine and ammonium hydroxide, and stirred until fully dissolved. After complete dissolution, the pH was about 8. The anti-foaming agent and the wetting agents were then added and mixed using a Dispermat (LC220-12) during 5 minutes at 500 rpm. Finally, the magnetic black pigment was added and dispersed during 5 minutes at 3000 rpm. The viscosity of the ink was 26.4 mPas at 1000 s$^{-1}$ and 25° C., and its surface tension was 23.7 mN/m.

The so obtained low viscosity black magnetic waterborne ink was printed using a flextensional printing head on a Gascogne paper laminate M-cote 120 substrate to form a rectangular-shaped pattern of dimensions 28 cm×13 cm. An ink layer with a thickness of about 6 μm was obtained, as determined using an Altisurf 500 (Altimet).

Two samples of the ink layer were peeled off to measure their magnetic performance using a VSM (vibrating sample magnetometer) by Lake Shore Cryotronics Inc., with a field strength of 1 Tesla. A complete hysteris loop was recorded for both samples, and the remanence (Wb/m$^2$) as well as the coercive field strength (Nm) were derived from the curves. Results appear on Table 2c below.

TABLE 2c remanence and coercivity of the magnetic ink layer

| Sample | Layer thickness [μm] | Sample surface [cm$^2$] | Sample volume [cm$^3$] | Remanence [Wb/m$^2$] | Coercive field strength [A/m] |
|---|---|---|---|---|---|
| 1 | 6 | 0.283 | $1.696 \cdot 10^{-4}$ | $3.194 \cdot 10^{-2}$ | $1.822 \cdot 10^4$ |
| 2 | 6 | 0.216 | $1.297 \cdot 10^{-4}$ | $3.642 \cdot 10^{-2}$ | $1.814 \cdot 10^4$ |

Despite the high concentration of the magnetic black pigment in the ink (20 wt-%), its high density (5200 kg/m$^3$) and its large particle size (D50=6.5 μm, D90=12.5 μm), the ink could be printed during several hours without clogging of the nozzles or sedimentation leading to reduced amounts of magnetic black pigment being deposited on the substrate.

Example 3

TABLE 3a (low viscosity solvent-based ink containing an up-converter) - composition

| Ingredients | Chemical composition | Quantity (wt-%) |
|---|---|---|
| Solvent 1 | Ethanol 95% (Brenntag) | 53.7 |
| Solvent 2 | Dowanol DPM (Brenntag) | 15 |

TABLE 3a-continued (low viscosity solvent-based ink containing an up-converter) - composition

| Ingredients | Chemical composition | Quantity (wt-%) |
|---|---|---|
| Solvent 3 | Ethyl acetate 99-100% (Brenntag) | 15 |
| Resin 1 | Nitrocellulose (Dow Chemicals) | 10 |
| Resin 2 | Polyurethane (Siegwerk) | 3.3 |
| Wetting agent | Active polymeric dispersant (Lubrizol) | 1 |
| Up-converter [c] | LUMILUX ® GREEN UC-3 53102 (Honeywell) | 2 |

Wherein [c] is an oxysulfide pigment with D50 about 3.45 μm, D90 about 12.5 μm, density about 4900 kg/m$^3$.

The density of the ink vehicle was measured as in Example 1 and 2 to be 868 kg/m$^3$.

The Peclet number (Pe) was calculated from the particle size $D90=1.25 \cdot 10^{-5}$ m, the calculated density 868 kg/m$^3$ of the ink vehicle and the density 4900 kg/m$^3$ of the pigment to be equal to about 62000 at room temperature.

The resins were added to the mixture of solvents and stirred at 45° C. until they were fully dissolved. The wetting agent was added, and finally the up-converter was added and dispersed during 5 minutes at 3000 rpm using a Dispermat (LC220-12). The viscosity of the ink was 11.6 mPas at 1000 s$^{-1}$ and 25° C., and its surface tension was 24.5 mN/m.

The so-obtained low viscosity solvent-based ink containing an up-converter was printed using a flextensional printing head on a Gascogne paper laminate M-cote 120 substrate to form a rectangular-shaped pattern of dimensions 28 cm×13 cm.

The printed sample was illuminated with a 980 nm laser diode (Ledgor Lighting Technology). Table 3c indicates the color properties of the printed patch upon illumination.

TABLE 3c (color properties of the IJ ink of Ex. 3 illuminated at 980 nm) - Results

|  | L* | c* | h* |
|---|---|---|---|
| w/o illumination | 0 | 0 | 0 |
| with illumination | 76.3 | 98 | 130 |

As it can be inferred from the results of Table 3c, the patch printed with the low viscosity solvent-based ink of Example 3 was clearly recognizable with the naked eye when illuminated with a NIR laser diode. Moreover, despite the high density (4900 kg/m$^3$) and the large particle size (D50=3.5 μm, D90=12.5 μm) of the up-converter, the ink could be printed during several hours without clogging of the nozzles or sedimentation leading to reduced amounts of up-converter being deposited on the substrate.

Example 4

TABLE 4a (low viscosity solvent-based ink containing a luminescent pigment) - composition

| Ingredients | Chemical composition | Quantity (wt-%) |
|---|---|---|
| Part A | | |
| Resin | Polyvinylbutyral (Sekisui) | 6.5 |
| Solvent 1 | Ethanol 95% (Brenntag) | 26.0 |

TABLE 4a-continued (low viscosity solvent-based ink containing a luminescent pigment) - composition

| Ingredients | Chemical composition | Quantity (wt-%) |
|---|---|---|
| Luminescent pigment [d] | LUMILUX ® GREEN CD 140 (Honeywell) | 10.0 |
| Wax | polytetrafluoroethylene modified polyethylene wax (Clariant) | 2.0 |
| Extender | AEROSIL ® 200 (Evonik) | 0.5 |
| Solvent 2 | n-propanol (Brenntag) | 5 |
| Part B | | |
| Solvent 3 | Ethanol 95% (Brenntag) | 25 |
| Solvent 4 | Dowanol DPM (Brenntag) | 25 |

Wherein [d] is a zinc sulfide pigment with D50 about 0.6 μm, D90 about 1.1 μm, density about 4100 kg/m³.

The density of the ink vehicle was calculated from the densities of the individual components to be 872 kg/m³.

The Peclet number (Pe) was calculated from the particle size D90=1.1·10⁻⁶ m, the calculated density 872 kg/m³ of the ink vehicle and the density 4100 kg/m³ of the pigment to be equal to about 3 at room temperature.

To prepare the inkjet ink of Ex. 4, 130 g resin were first added to 520 g ethanol 95% (solvent 1) and stirred at 45° C. until fully dissolved. This solution was cooled down to room temperature and poured into the container of an APS 3000 bead milling system (VMA Getzmann GmbH). 200 g luminescent pigment, 40 g of wax, 10 g extender and 100 g n-propanol (solvent 2) were sequentially added while gently stirring. A DMS 100 double-blade polyamide impeller attached to a Dispermat CN 20 (VMA Getzmann GmbH) was then lowered into the mixture. The impeller was slowly rotated and 500 g glass beads (02.85-3.3 mm, VMA Getzmann GmbH) were added. The mixture was finally dispersed during 5 minutes at 5000 rpm. This process provided 1 kg of ink concentrate (part A) containing 20% luminescent pigment.

500 g of ink concentrate (part A) was added under gentle stirring to a mixture (part B) of 250 g ethanol 95% (solvent 3) and 250 g Dowanol DPM (solvent 4). This yielded 1 kg of the low viscosity solvent-based ink of Example 4, containing 10% luminescent pigment. The viscosity of the final ink was 14.8 mPas at 1000 s⁻¹, and its surface tension was 24 mN/m.

The so-obtained low viscosity solvent-based ink containing a luminescent pigment was printed using a flextensional printing on a Gascogne paper laminate M-cote 120 substrate to form a rectangular-shaped pattern of dimensions 28 cm×13 cm.

The printed sample was illuminated with a UV lamp (Fovea UV-512) at 365 nm to generate a strong green emission. Table 4c indicates the color properties of the printed patch upon illumination.

TABLE 4c (colour properties of the IJ ink of Ex. 4 illuminated at 365 nm) - Results

| | L* | c* | h* |
|---|---|---|---|
| w/o illumination | 0 | 0 | 0 |
| with illumination | 85 | 83 | 147 |

Despite the high density (4100 kg/m³), the high concentration (10%) and the large particle size (D50=0.6 μm, D90=1.1 μm) of the luminescent pigment, the ink could be printed during several hours without clogging of the nozzles or sedimentation leading to reduced amounts of luminescent pigment being deposited on the substrate.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. A method for printing a security feature on a medium comprising
   inkjet printing an ink including one or more pigments, wherein at least one pigment satisfies the formula $$1\,000\,000 > \frac{\pi\,\Delta\rho\,g\,d^4}{12\,k_B T} > 10$$

whereas
   $\Delta\rho$ is a density difference between pigment and ink vehicle
   g is an earth acceleration constant
   d is a pigment particle diameter D90;
   $k_B$ is a Boltzmann constant; and
   T is a temperature;
   wherein the pigment particle diameter D90 is from about 1 μm to about 50 μm;
   wherein the ink has a viscosity of less than 30 mPa*s at 1000 s⁻¹ and 25° C.;
   whereas inkjet printing of the ink is performed by a flextensional ink jet print head structure; and
   printing is performed to provide one or more security features on the medium.

2. The method according to claim 1,
   whereas the at least one pigment comprise a security pigment.

3. The method according to claim 2,
   whereas the security pigments are selected from the group consisting of magnetic pigments, IR-absorbing pigments, optically variable pigments, luminescent pigments, conductive pigments and combinations thereof.

4. The method according to claim 1,
   whereas the security features comprise a QR code, a bar code, alphanumeric insignia, overt features, semi overt features and/or a varnished zone.

5. The method according to claim 1, whereas the medium is selected from the group consisting of papers or other fibrous materials, paper-containing materials, glasses, metals, ceramics, polymers, metalized polymers, composite materials and mixtures or combinations thereof.

6. The method according to claim 5, whereas the medium comprises an ink-receptive layer.

7. A printing system for printing a security feature according to a method according to claim 1, comprising:
   a flextensional ink jet print head structure for printing an ink;
   ink including one or more pigments, wherein at least one pigment satisfies the formula $$1\,000\,000 > \frac{\pi\,\Delta\rho\,g\,d^4}{12\,k_B T} > 10$$

whereas
- Δρ is a density difference between pigment and ink vehicle
- g is an earth acceleration constant
- d is a pigment particle diameter D90;
- $k_B$ is a Boltzmann constant; and
- T is a temperature, wherein the pigment particle diameter D90 is from about 1 μm to about 50 μm;

wherein the ink has a viscosity of less than 30 mPa*s at 1000 s$^{-1}$ and 25° C.

8. The printing system according to claim 7, whereas the security feature comprises a QR code, a bar code, alphanumeric insignia and/or a varnished zone.

9. The printing system according to claim 7, whereas the at least one pigment comprise a security pigment.

10. The printing system according to claim 9, whereas the security pigments are selected from the group consisting of magnetic pigments, IR-absorbing pigments, optically variable pigments, luminescent pigments, conductive pigments and combinations thereof.

* * * * *